(12) United States Patent
Patel et al.

(10) Patent No.: US 9,686,658 B2
(45) Date of Patent: Jun. 20, 2017

(54) METHOD AND APPARATUS FOR ADAPTIVE EVENT NOTIFICATION CONTROL

(71) Applicant: MBIT WIRELESS, INC., Newport Beach, CA (US)

(72) Inventors: Bhaskar Patel, San Clemente, CA (US); Arumugam Govindswamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 188 days.

(21) Appl. No.: 14/331,839

(22) Filed: Jul. 15, 2014

(65) Prior Publication Data
US 2015/0017954 A1   Jan. 15, 2015

Related U.S. Application Data

(60) Provisional application No. 61/846,075, filed on Jul. 15, 2013.

(51) Int. Cl.
*H04W 4/12* (2009.01)
*H04M 19/04* (2006.01)

(52) U.S. Cl.
CPC ............. *H04W 4/12* (2013.01); *H04M 19/04* (2013.01)

(58) Field of Classification Search
CPC ...................................................... H04W 4/12
See application file for complete search history.

(56) References Cited

U.S. PATENT DOCUMENTS

| 2003/0003965 | A1* | 1/2003 | Gough | H04M 1/72577 455/567 |
| 2004/0203673 | A1* | 10/2004 | Seligmann | H04M 1/72547 455/415 |
| 2004/0259536 | A1* | 12/2004 | Keskar | H04M 1/72569 455/418 |
| 2006/0116175 | A1* | 6/2006 | Chu | H04M 1/72569 455/567 |
| 2006/0229099 | A1* | 10/2006 | Chen | H04M 1/72563 455/556.1 |
| 2006/0240877 | A1* | 10/2006 | Filiba | H04M 1/72566 455/567 |

(Continued)

*Primary Examiner* — Nathan Mitchell
*Assistant Examiner* — Ernest Tacsik
(74) *Attorney, Agent, or Firm* — Lerner, David, Littenberg, Krumholz & Mentlik, LLP (57) ABSTRACT

Modern mobile communication devices have a number of features that enable the users to stay connected with people in their contacts list. These mobile devices also keep users informed about various events such as email, text messages, etc. While these features are useful they can be intrusive or distracting under some conditions. To reduce disturbances and intrusions, various notifications that inform the user about the new events on the mobile device may be temporarily disabled. However, event notifications must be explicitly re-enabled by the user when it is free to receive the notifications. The user may forget to re-enable the event notification which may lead to missed calls, event notifications, etc. A method and apparatus are provided that disable and enable event notifications on mobile devices adaptively to allow the users to reduce the intrusiveness of the mobile device notification when not required while minimizing any missed event notifications.

22 Claims, 5 Drawing Sheets

(56) References Cited

U.S. PATENT DOCUMENTS

| | | | | |
|---|---|---|---|---|
| 2006/0248183 | A1* | 11/2006 | Barton | H04L 12/587 709/224 |
| 2008/0207263 | A1* | 8/2008 | May | H04M 1/72566 455/556.2 |
| 2008/0261554 | A1* | 10/2008 | Keller | G08B 27/006 455/404.1 |
| 2009/0088221 | A1* | 4/2009 | Gilbert | H04M 1/72566 455/567 |
| 2009/0298511 | A1* | 12/2009 | Paulson | H04M 19/04 455/456.1 |
| 2010/0069007 | A1* | 3/2010 | Nagasawa | H04M 1/6066 455/41.3 |
| 2011/0197134 | A1* | 8/2011 | Kulmala | G06Q 50/01 715/736 |
| 2013/0324071 | A1* | 12/2013 | Huh | H04W 4/22 455/404.1 |

* cited by examiner

METHOD AND APPARATUS FOR ADAPTIVE EVENT NOTIFICATION CONTROL

CROSS-REFERENCE TO RELATED APPLICATIONS

This application claims the benefit of the filing date of U.S. Provisional Application No. 61/846,075 filed Jul. 15, 2013 and entitled "METHOD AND APPARATUS FOR ADAPTIVE EVENT NOTIFICATION CONTROL," the entire disclosure of which is hereby expressly incorporated by reference herein.

BACKGROUND OF THE INVENTION

The present invention relates generally to client terminals and particularly to mobile communication devices under different use cases.

Mobile communication devices offer a wide range of functionality beyond basic voice calls. For example, text messaging, Instant Messenger (IM) based messaging, mobile internet services, etc. In Smartphones, even more functionality is integrated into the devices such as email, social networking, maps and navigation, and many other applications. In the present document, the terms client terminal, user terminal, user equipment, Smartphone, or mobile, mobile device are used interchangeably.

The increased functionality has led to the users being connected to their contacts almost all the time. This may be desirable in many cases but in some cases the connection must be disabled, at least temporarily. For example, when going to any quiet public place such as a library, offices, an auditorium, movie theatre, etc. In such places it may be required to disable, at least partially, the notification of various events such as incoming call, text messages, email, voice mail, social networking updates, etc. In some cases even the non-audible alerts such as vibration may not be acceptable.

Many mobile device users keep their mobile near them when they go to sleep. It is undesirable to provide audible or vibration alert when the user is resting.

Conventional mobile devices offer capability to disable notifications. The disabling can be done at different levels such as no-audible alerts but vibration may be allowed or completely silent but the display may lighten up when an event requiring alert occurs. A shortcoming of the conventional methods is that often users do not remember to re-enable the notification or turn the mobile device back on after they leave quiet public places or when they wakeup. This may lead to missed phone calls, text messages, and other missed events. This may cause variety of problems for the user depending on the nature of the call or text message that may be missed.

SUMMARY OF THE INVENTION

Aspects of the present invention involve disabling event notification alerts in a portable communication device for a specified amount of time, and re-enabling such event notification alerts at or after the specified amount of time. A method and apparatus are provided that adaptively disable and enable event notifications on mobile devices to allow the users to reduce the intrusiveness of a notification when not required, while also minimizing the likelihood of any missed event notifications.

DETAILED DESCRIPTION

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the invention is not intended to be limited to the specific terms used.

A method and apparatus are disclosed that provide means to disable the event notification alerts and automatically re-enable the event notification alerts at or after the specified amount of time. According to an aspect of the present invention, when the user disables any type of event notification alert the user is required to enter the time duration for which the event notification alert is to be disabled. Once this information is entered by the user, the mobile device disables the specified event notification alert and re-enables the specified event notification alert after the specified amount of time.

According to another aspect of the present invention, the user may set the normal sleep and wakeup times and based on this input the mobile device automatically disables the alerts at sleep time and re-enables the event alerts at wakeup time. According to another aspect of the invention, whenever a wake-up alarm of any type occurs, all the specified event alerts may be enabled. According to another aspect of the invention, when the wake-up event occurs, all the previously received but un-notified events are notified at wake-up event.

According to another aspect of the present invention, the lighting of the display when an event occurs may also be disabled. This aspect is useful in avoiding disturbance to the user's sleep by sudden flash of light while the user is asleep.

Many users put their mobile devices for charging at night. Sometime during the course of the night the charging completes and a notification is given that the charge is complete. According to another aspect of the invention, the charge complete notification may be disabled during the sleep interval.

According to another aspect of the invention, the disabling of the event notification may be specific to the identity of the caller. For example, a user may always want to receive a call from a particular user under any circumstances.

According to another aspect of the invention the event notification may be adaptive such that if a particular user calls for a specified number of times within a specified amount of time, the user may be notified even though the single event for that call is not notified.

According to another aspect of the invention, a user may designate certain phone numbers or users as crank-callers/spam and event notification from such phone numbers or user IDs may be disabled. According to another aspect of the invention a log of such events may be maintained for scrutiny by the user at a later time.

Many mobile devices include the ability to determine location, for example using the Global Positioning System (GPS). According to another aspect of the invention if the mobile device determines that its location has changed by a configurable distance, some configurable alerts or all the alerts may be turned on. For example, when leaving a movie theatre, library, etc. the call notification alert may be re-enabled.

According to another aspect of the invention, if the user interacts with the mobile device, all the alerts may be turned on or configurable subset of them may be turned on automatically. This may happen for example when coming out of a meeting, answering the wake up call, etc.

According to another aspect of the invention, if the mobile device connects to the car BLUETOOTH device or headset, all or sub-set of the alerts may be turned on.

According to another aspect of the invention, if the user interacts with the mobile device, a reminder may be provided to turn on the notification alerts.

According to another aspect of the invention, the various alerts in the mobile device may be grouped into several categories and each category may be configured by the user to be associated with notification alert event on/off conditions and scenarios.

Figure 1:
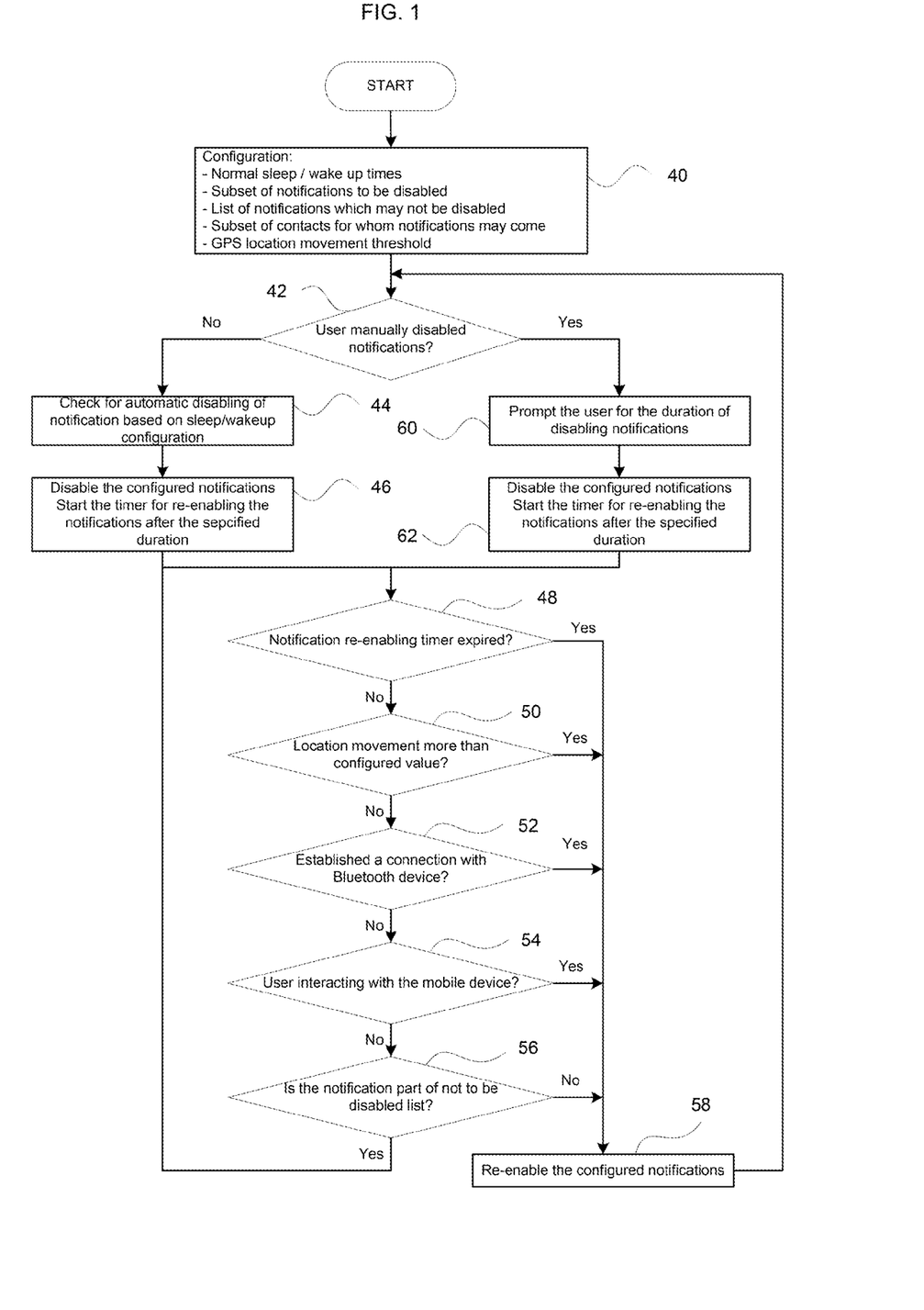
FIG. 1 illustrates the flow chart which describes the processing steps in accordance with the aspects of the present invention

By way of example only, the flowchart contained FIG. 1 illustrates the sequence of steps that an apparatus may follow according to the method described herein.

As shown at block 40, the configuration may include one or more parameters related to normal sleep and/or wake up times, a subset of notifications to be disabled, a list of notifications that may not be disabled, a subset of contacts for whom notifications may come, and a location movement threshold, using, e.g., GPS coordinates.

As shown in the first decision box 42, an evaluation is performed to determine whether there are any notifications that have been disabled by the user or otherwise manually disabled. If no user manual disabled notifications exist, the process proceeds to block 44, where a check for automatic disabling of notification based on sleep and/or wake up configuration is performed. And at block 46, the configuration notifications are disabled. Here, a timer for re-enabling the notifications after the specified duration is started.

The process next proceeds to one or more decisions. For instance, at block 48, a determination is made whether the notification re-enabling timer has expired. If not, at block 50 a determination is made whether there has been location movement more than a configured (e.g., predetermined) value. If not, at block 52 a determination is made whether a connection has been established with another device, such as a BLUETOOTH-enabled device. If not, then at block 54 a determination is made whether the user is interacting with the mobile device. If not, it is determined whether the notification is part of the "not to be disabled" list of notifications. When any of these decisions at blocks 48-54 is a "yes" decision, then the process proceeds to block 58, where the configuration notifications are re-enabled. At block 56, when the determination is a "no" decision, the process proceeds to block 56; otherwise, the process returns to block 46.

When there are one or more user manual disabled notifications at block 42, the process proceeds to block 60, where the user is prompted for the duration of the disabling notification(s). And at block 62, the configured notification(s) is disabled. This process also starts a timer for re-enabling the notification(s) after the specified duration. Then the process proceeds to block 48, which is discussed above.

Figure 2:
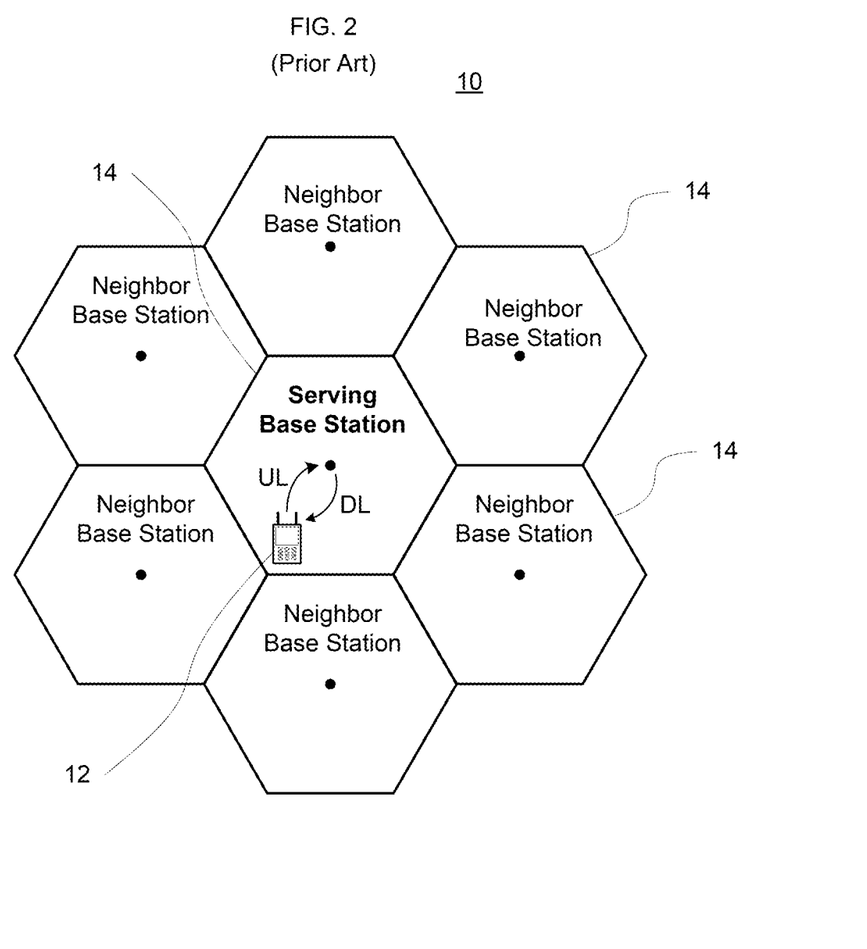
FIG. 2 illustrates a conventional wireless cellular communication system.

By way of example only, the above-described method may be implemented in a receiver, e.g., a user device such as a wireless mobile station ("MS") 12 as shown in FIG. 2.

Figure 3:
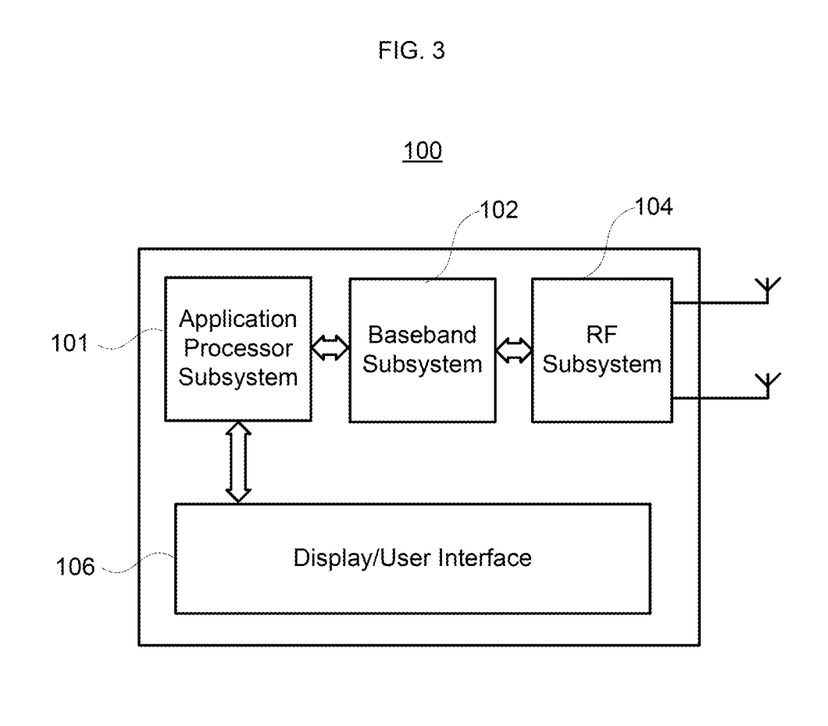
FIG. 3 illustrates a wireless mobile station diagram.

As shown in FIG. 3, MS 100 may include an application processor subsystem 101, baseband subsystem 102 and a radio frequency ("RF") subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 4:
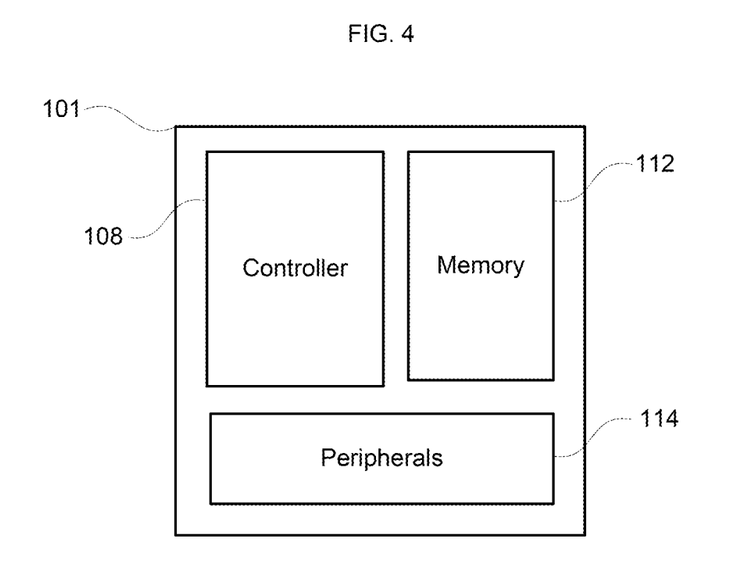
FIG. 4 illustrates an application processor subsystem for a wireless mobile station.
Figure 5:
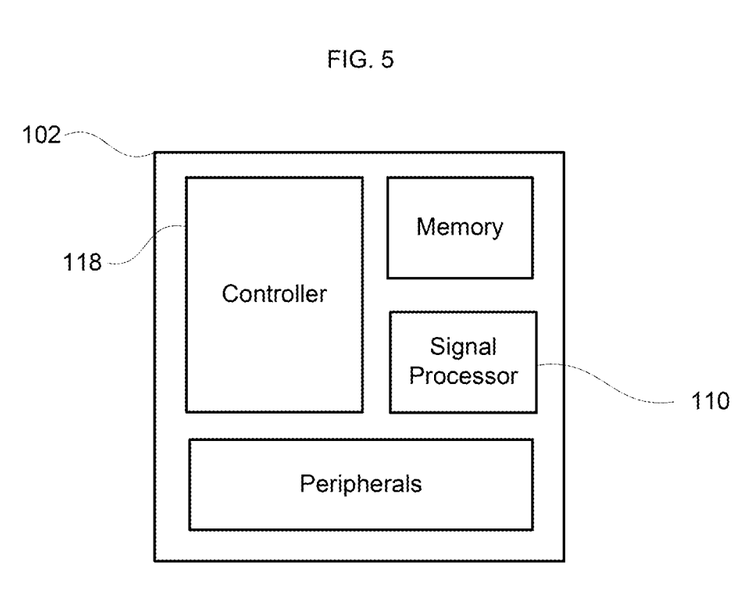
FIG. 5 illustrates a baseband subsystem for a wireless mobile station.
Figure 6:
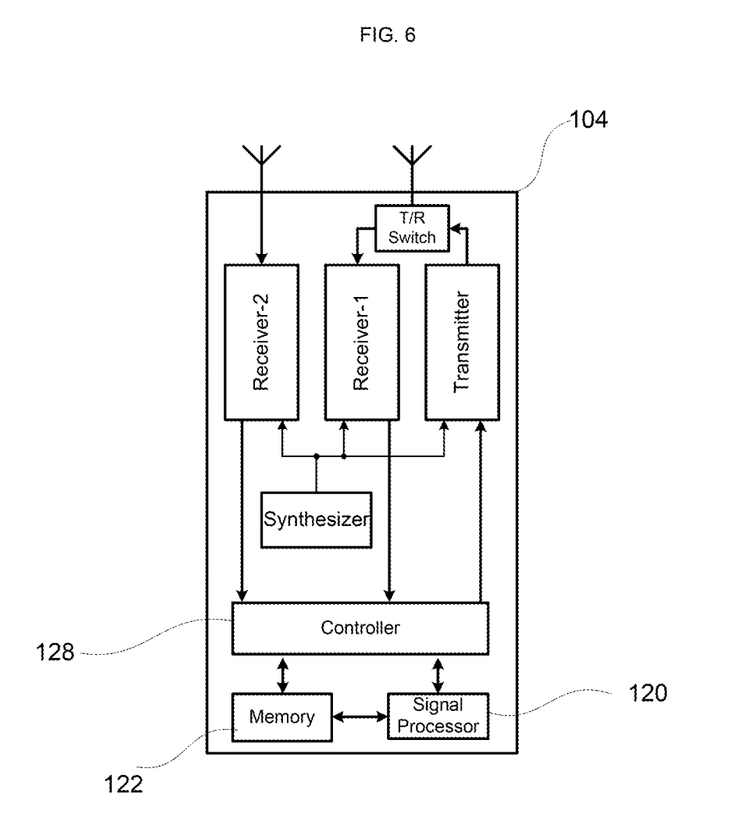
FIG. 6 illustrates an RF subsystem for a wireless mobile station.

The application processor subsystem 101 as shown in FIG. 4 may include a controller 108 such as a microcontroller or other processor. The baseband subsystem 102 as shown in FIG. 5 may include a controller 118 such as a microcontroller or other processor. The RF subsystem 104 as shown in FIG. 6 may include a controller 128 such as a microcontroller or other processor. The controller 108 desirably handles overall operation of the MS 100. This may be done by software or firmware running on the controller 108. Such software/firmware may embody any methods in accordance with aspects of the present invention.

Peripherals 114 such as a full or partial keyboard, video or still image display, audio interface, etc may be employed and managed through the controller 108.

Aspects of the present invention may be implemented in firmware of the controller 108 of the application processor and/or the controller 118 of the baseband subsystem. In another alternative, aspects of the present invention may also be implemented as a combination of firmware and hardware of the application processor subsystem 101 and/or the baseband subsystem 102. For instance, a signal processing entity of any or all of the FIG. 5 may be implemented in firmware, hardware and/or software. It may be part of the baseband subsystem, the receiver subsystem or be associated with both subsystems.

In one example, the controller 118 and/or the signal processor 110 may include or control the protocol entity circuitry. The software may reside in internal or external memory and any data may be stored in such memory. The hardware may be an application specific integrated circuit ("ASIC"), field programmable gate array ("FPGA"), discrete logic components or any combination of such devices. The terms controller and processor are used interchangeably herein.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Aspects of each embodiment may be employed in the other embodiments described herein.

The invention claimed is:

1. A method to manage one or more notifications of a client device, the method comprising:

initializing, by one or more computing devices of or coupled to the client device, a configuration to manage the one or more notifications of the client device, the configuration including a set of the one or more notifications to be disabled and at least one of a sleep time and a wakeup time for each notification;

performing, by the one or more computing devices, a check whether to automatically disable the one or more notifications by applying the configuration of the set of notifications to be disabled and the at least one of the sleep time and the wakeup time;

automatically disabling, by the one or more computing devices, the set of notifications in response to the check;

upon automatic disablement, starting, by the one or more computing devices, a timer for re-enabling any automatically disabled notifications, the timer indicating a duration for the automatically disabled notifications to remain disabled;

determining, by the one or more computing devices, whether the timer has expired;

upon expiration of the timer, the one or more computing devices re-enabling the automatically disabled notifications to alert the client device of an event; and when a user of the client device interacts by a predetermined user interaction with the client device during automatic disablement prior to expiration of the timer, in which the predetermined user interaction with the client device is other than manually enabling one or more of the disabled notifications by the user, enabling, by the one or more computing devices, one or more of the disabled notifications, in which the predetermined user interaction is answering a wakeup alert generated by a wakeup alert operation of the client device.

2. The method of claim 1, wherein the timer is a first timer and the method further comprises:

evaluating whether any notifications of the client device have been manually disabled;

when it is determined that any notifications of the client device have been manually disabled, requesting a duration for the manual disablement;

starting a second timer for re-enabling any manually disabled notifications; and upon expiration of the second timer, re-enabling the manually disabled notifications.

3. The method of claim 1, wherein the configuration further includes one or more of: a list of notifications that cannot be automatically disabled, a subset of user contacts, and a location movement threshold.

4. The method of claim 3, wherein the method further comprises:

determining whether the location movement threshold has been exceeded during automatic disablement prior to expiration of the timer; and upon determining that the location movement threshold has been exceeded, performing the re-enabling of the automatically disabled notifications.

5. The method of claim 3, further comprising:

determining whether an incoming communication received by the client device during automatic disablement prior to expiration of the timer is from a given one of the subset of user contacts;

upon determining that the incoming communication is from the given user contact, evaluating a user preference for receiving a notification of the incoming communication; and performing notification of the incoming communication in correspondence with the user preference.

6. The method of claim 5, wherein evaluating the user preference includes determining how many times incoming communications are received from the given user contact within a specified amount of time.

7. The method of claim 5, wherein evaluating the user preference includes determining whether notifications cannot be automatically disabled for the given user contact.

8. The method of claim 1, wherein, when the client device is connected with another device during automatic disablement prior to expiration of the timer, enabling one or more of the disabled notifications.

9. A processing system to manage one or more notifications of a client device, the processing system comprising:

memory configured to store a notification configuration including a set of the one or more notifications and at least one of a sleep time and a wakeup time for each notification; and one or more computing devices of or coupled to the client device, operatively coupled to the memory and configured to:

initialize the configuration to manage the one or more notifications of the client device;

perform a check whether to automatically disable the one or more notifications by applying the configuration of the set of notifications to be disabled and the at least one of the sleep time and the wakeup time;

automatically disable the set of notifications in response to the check;

upon automatic disablement, start a timer for re-enabling any automatically disabled notifications, the timer indicating a duration for the automatically disabled notifications to remain disabled;

determine whether the timer has expired;

upon expiration of the timer, re-enable the automatically disabled notifications to alert the client device of an event; and when a user of the client device interacts by a predetermined user interaction with the client device during automatic disablement prior to expiration of the timer, in which the predetermined interaction with the client device is other than manually enabling one or more of the disabled notifications by the user, enable one or more of the disabled notifications, in which the predetermined user interaction is answering a wakeup alert generated by a wakeup alert operation of the client device.

10. The processing system of claim 9, wherein the timer is a first timer and the one or more computing devices are further configured to:

evaluate whether any notifications of the client device have been manually disabled;

when it is determined that any notifications of the client device have been manually disabled, request a duration for the manual disablement;

start a second timer for re-enabling any manually disabled notifications; and upon expiration of the second timer, re-enable the manually disabled notifications.

11. The processing system of claim 9, wherein the configuration further includes one or more of: a list of notifications that cannot be automatically disabled, a subset of user contacts, and a location movement threshold.

12. The processing system of claim 11, wherein the one or more computing devices are further configured to:

determine whether the location movement threshold has been exceeded during automatic disablement prior to expiration of the timer; and upon determining that the location movement threshold has been exceeded, perform the re-enabling of the automatically disabled notifications.

13. The processing system of claim 11, wherein the one or more computing devices are further configured to:

determine whether an incoming communication received by the client device during automatic disablement prior to expiration of the timer is from a given one of the subset of user contacts;

upon determining that the incoming communication is from the given user contact, evaluate a user preference for receiving a notification of the incoming communication; and perform notification of the incoming communication in correspondence with the user preference.

14. The processing system of claim 13, wherein evaluating the user preference includes determining how many times incoming communications are received from the given user contact within a specified amount of time.

15. The processing system of claim 13, wherein evaluating the user preference includes determining whether notifications cannot be automatically disabled for the given user contact.

16. The processing system of claim 9, wherein, when the client device is connected with another device during automatic disablement prior to expiration of the timer, the one or more computing devices are further configured to enable one or more of the disabled notifications, in which the another device is external to the one or more computing devices and the client device.

17. A client device comprising:

memory configured to store a notification configuration including a set of one or more notifications and at least one of a sleep time and a wakeup time for each notification; and one or more computing devices operatively coupled to the memory and configured to:

initialize the configuration to manage the one or more notifications of the client device;

perform a check whether to automatically disable the one or more notifications by applying the configuration of the set of notifications to be disabled and the at least one of the sleep time and the wakeup time;

automatically disable the set of notifications in response to the check;

upon automatic disablement, start a timer for re-enabling any automatically disabled notifications, the timer indicating a duration for the automatically disabled notifications to remain disabled;

determine whether the timer has expired;

upon expiration of the timer, re-enable the automatically disabled notifications to alert the client device of an event; and when a user of the client device interacts by a predetermined user interaction with the client device during automatic disablement prior to expiration of the timer, in which the predetermined user interaction with the client device is other than manually enabling one or more of the disabled notifications by the user, enable one or more of the disabled notifications, in which the predetermined user interaction is answering a wakeup alert generated by a wakeup alert operation of the client device.

18. The method of claim 1, further comprising:

upon expiration of the timer, the one or more computing devices controlling alerting of the client device of all previously received events which are un-notified.

19. The method of claim 1, wherein the wakeup alert is a wakeup call.

20. The method of claim 1, further comprising:

determining, by the one or more computing device, whether a given incoming communication received by the client device is from a given one of a subset of user contacts indicated with a notification disablement setting; and generating, by the one or more computing device, a log indicating each notification of incoming communication disabled at the client device, based on a determination that the given incoming communication is from the given one of the subset of user contacts, in which the log is configured to be accessible by the user of the client device.

21. The method of claim 1, further comprising:

providing, by the one or more computing device, a reminder to disable the one or more notification, when a determination is the user interacted with the client device.

22. The method of claim 1, wherein the configuration includes a plurality of notification categories for categorizing the one or more notifications, in which each of said notification categories is associated with a respective notification alert event condition.

* * * * *